J. V. A. WEMPLE.
Straw Carrier.
No. 10,195.
Patented Nov. 1, 1853.
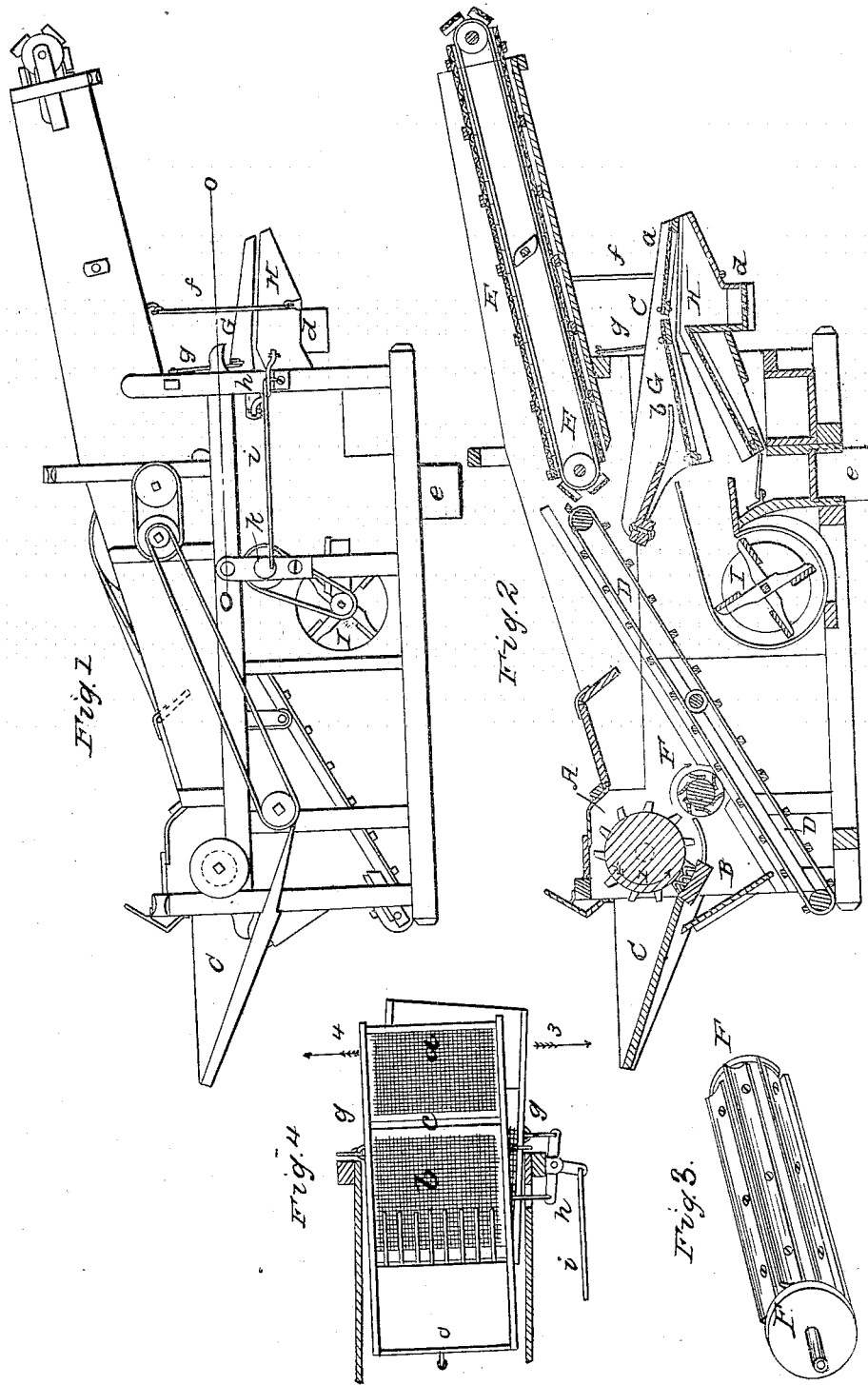

UNITED STATES PATENT OFFICE.

J. V. A. WEMPLE, OF CHICAGO, ILLINOIS.

GRAIN-SEPARATOR.

Specification of Letters Patent No. 10,195, dated November 1, 1853.

*To all whom it may concern:*

Be it known that I, JACOB V. A. WEMPLE, of Chicago, in the county of Cook and State of Illinois, have invented a new and useful Improvement in Machines for Threshing, Separating, and Cleaning Grain; and I do hereby declare that the following is a full, clear, and exact description of the same, reference being had to the accompanying drawings, forming part of this specification, in which—

Figure 1 is a side elevation. Fig. 2 is a longitudinal section. Fig. 3 is a detached perspective view of the cylinder F. Fig. 4 is a horizontal section in part taken as indicated by the line O O Fig. 1, and mainly showing the double shoe and its appurtenances.

The same letters of reference denote corresponding parts throughout the several figures.

The nature of my invention consists—

1st, in the employment of a peculiarly constructed separating and break-cylinder so situated and operating as regards the threshing cylinder as to break the force with which the straw and grain is thrown on to the endless apron also serving as a partial separator; 2nd, in the shoe, which I make double, the sieves of the upper one being in two lengths with a space between them for the "headings" to pass through and the upper and lower shoe vibrating simultaneously in opposite directions to produce a counteracting effect or shock on the machine.

To enable others skilled in the art to make and use my invention I will proceed more minutely to describe it.

The machine represented in the drawings, is, with the exception of the parts above specified, for the most part the same as that patented by myself conjointly with George Westinghouse bearing date the thirteenth (13th) day of July eighteen hundred and forty-four (1844), or is otherwise similar to other and well known machines. I shall therefore in this, only so far refer to such parts, being common, immediately connected with the specified details forming my improvement, as is necessary for elucidation of the latter.

A is the threshing cylinder which revolves as indicated by arrow 1 and operates in combination with the concave B in the usual manner, the unthreshed grain being fed in by the chute C.

D is the endless apron acting as en elevator and conveyer to the separator E. To prevent injury to the endless apron D by the force with which the grain and straw are thrown toward it from the thresher, and more effectually to separate the grain from the straw, I propose to employ what may be called a separating and break cylinder F situated on the underside at the back of the threshing cylinder and immediately over or above the inclined apron D; its situation, thus described, and diameter are so proportioned as to leave a space for the passage of the straw over above it and between the teeth of the threshing cylinder; it is of the same length or thereabout as the threshing cylinder or as the width of the apron D; it causes, as will be seen from its motion, the straw to ride over it on to the endless apron D and so breaks the force of the delivery from the threshing cylinder, thereby protecting from injury the endless apron: it also serves as a partial separator to the straw headings and grain passing over it, as will be evident from the following description of its construction: I make a shaft or roller of four (4) inches in diameter, more or less, with flattened surfaces along or across its periphery on which I fit plates of iron extending the length of the roller and projecting slightly as it were at a tangent from it in the direction of its travel or otherwise slightly bend outward the projecting edges of the plates which serve to perform the offices specified.

G is the upper and H is the lower shoe, constituting in combination a double shoe, which, as regards receiving and operating on the grain, is similar to those in present use excepting that the sieve of the upper shoe is made of two distinct sieves $a$ $b$ having a space $c$ in between them for the "headings" to pass through (which are delivered separately by a partition across the lower shoe through a spout $d$) : I also design to fix guards to the upper shoe, on its under side, so that, when vibrating, to keep the grain from falling on the outside of the lower shoe which receives the grain as it passes from the upper shoe and conducts it to the spout $e$ below, and which is hung to the machine by the center, on its lower end, above the grain spout, and by rods $f$ $f$ near its upper end, so as to admit of its vibrations in the manner indicated by arrows 3, 4. The upper shoe is also hung to vibrate in a similar manner, rods *g g* answering the same purpose for it as the rods *f f* do for the lower shoe.

I is the usual fan for cleansing the grain.

The shoes G and H have their vibratory motions (necessary as is well known for separating and conducting the grain) in opposite directions simultaneously to one another,—to wit—the lower shoe moves as indicated by arrow 3 while the upper shoe travels as denoted by arrow 4, and vice versa, so that a counteracting or counterbalancing effect is produced tending to destroy the vibratory motion or shake of the machine and thereby rendering it more durable and stable; this cross vibratory action of the two shoes is effected by a T shaped shaker *h* working on a fulcrum attached to the frame of the machine and being operated by a rod *i* traveling backward and forward through its eccentric connection, at the other end, to a revolving disk *k*, the said shaker having one of its arms attached to the upper shoe and its other arm to the lower shoe which produces the actions specified.

The other parts of the machine shown in the drawings are well known and need no explanation, nor has it been deemed necessary to refer by letter to the several pulleys and belts communicating the motions as these might be varied and their necessary arrangement and operation are well known.

What I claim as my invention and desire to secure by Letters Patent, is—

The employment of a cylinder F having tangential or other suitably projecting plates across or along its periphery for the purposes of separating the grain and breaking the impinging effect produced by the threshing cylinder on the endless apron D, the said cylinder (F) being so situated and operating in rear of the threshing cylinder as gently to feed over it the straw and headings as they are delivered from the threshing cylinder.

In testimony whereof I have hereunto signed my name before two subscribing witnesses.

JACOB V. A. WEMPLE.

Witnesses:
SIMON I. VEEDER,
SIMON V. KLINE.